United States Patent
Ennis

(10) Patent No.: US 11,801,810 B1
(45) Date of Patent: Oct. 31, 2023

(54) LINEAR CONVEYOR FOR VEHICLES WHILE TRAVERSING A VEHICLE WASHING SYSTEM

(71) Applicant: G. Thomas Ennis, Venice, CA (US)

(72) Inventor: G. Thomas Ennis, Venice, CA (US)

( * ) Notice: Subject to any disclaimer, the term of this patent is extended or adjusted under 35 U.S.C. 154(b) by 0 days.

(21) Appl. No.: 18/106,086

(22) Filed: Feb. 6, 2023

Related U.S. Application Data

(60) Provisional application No. 63/306,568, filed on Feb. 4, 2022.

(51) Int. Cl.
*B60S 3/00* (2006.01)
*B65G 25/12* (2006.01)

(52) U.S. Cl.
CPC .............. *B60S 3/004* (2013.01); *B65G 25/12* (2013.01); *B65G 2812/12* (2013.01)

(58) Field of Classification Search
None
See application file for complete search history.

(56) References Cited

U.S. PATENT DOCUMENTS

| | | | |
|---|---|---|---|
| 1,048,388 A | 12/1912 | Bracken | |
| 3,233,557 A | 2/1966 | Rickel | |
| 3,486,609 A | 12/1969 | Rogers | |
| 3,554,132 A * | 1/1971 | Hanna | B61B 10/04 198/732 |
| 3,685,079 A * | 8/1972 | Dawson | B60S 3/004 104/44 |
| 3,731,636 A * | 5/1973 | Reimer | B65G 17/061 104/44 |
| 3,789,766 A | 2/1974 | Hurwitz | |
| 3,832,953 A | 9/1974 | Aaron | |
| 3,838,769 A | 10/1974 | Traughber | |
| 3,938,532 A * | 2/1976 | Babunovic | B08B 9/34 134/152 |
| 3,986,605 A * | 10/1976 | Dooley | B65G 13/00 198/747 |
| 4,039,075 A | 8/1977 | Gray | |
| 4,342,387 A * | 3/1982 | Gray | B65G 25/10 |
| 4,374,496 A * | 2/1983 | Hanna | B60S 3/004 198/732 |
| 4,523,672 A * | 6/1985 | Navarro | B22D 11/126 198/744 |
| 4,864,936 A * | 9/1989 | Rietsch, Jr. | B62D 65/18 198/732 |

(Continued)

FOREIGN PATENT DOCUMENTS

| | | |
|---|---|---|
| CA | 699303 A | 12/1964 |
| DE | 1051767 B | 3/1959 |
| FR | 1423387 | 1/1965 |

*Primary Examiner* — Joseph A Dillon, Jr.
(74) *Attorney, Agent, or Firm* — RISSO I.P.

(57) ABSTRACT

Described is a linear conveyor for advancing vehicles through a vehicle washing system. The linear conveyor includes a pair of reciprocating platforms having a plurality of counterweighted and pivotally connected pawls. The pawls are biased such that they are angled upwards and in a forward direction at rest. Alternating motion of the reciprocating platforms causes a vehicle to move forward along the linear conveyor by pressing the pawl into the rear of the tire in a forward motion, while a rearward moving reciprocating platform slides underneath the tires of the vehicle on an opposite side of the vehicle.

16 Claims, 13 Drawing Sheets

(56) References Cited

U.S. PATENT DOCUMENTS

| | | | | |
|---|---|---|---|---|
| 5,027,714 | A * | 7/1991 | England | B65G 25/04 |
| | | | | 104/162 |
| 5,228,392 | A * | 7/1993 | Belanger | B65G 19/02 |
| | | | | 104/162 |
| 6,161,682 | A * | 12/2000 | Sarig | B60S 3/004 |
| | | | | 198/804 |
| 8,028,628 | B2 * | 10/2011 | Ennis | B60S 3/004 |
| | | | | 104/162 |
| 8,215,476 | B2 * | 7/2012 | Ennis | B60S 3/004 |
| | | | | 414/257 |
| 8,413,669 | B2 * | 4/2013 | Barreyre | H05B 3/02 |
| | | | | 198/339.1 |
| 8,789,545 | B2 * | 7/2014 | Ennis | B60S 3/042 |
| | | | | 134/123 |
| 9,376,091 | B2 * | 6/2016 | Ennis | B65G 19/205 |
| 9,427,765 | B1 * | 8/2016 | Ennis | B08B 3/041 |
| 9,474,107 | B2 * | 10/2016 | Barreyre | H05B 3/283 |
| 10,137,866 | B1 * | 11/2018 | Ennis | B05B 1/36 |
| 2004/0123884 | A1 * | 7/2004 | Ecker | A47L 15/248 |
| | | | | 134/125 |
| 2006/0219127 | A1 * | 10/2006 | Ennis | B60S 3/004 |
| | | | | 104/165 |
| 2006/0225601 | A1 * | 10/2006 | Belanger | B60S 3/004 |
| | | | | 104/165 |
| 2008/0029135 | A1 * | 2/2008 | McCadden | B60S 3/04 |
| | | | | 134/123 |
| 2019/0135241 | A1 * | 5/2019 | Ennis | B60S 3/04 |

\* cited by examiner

106

LINEAR CONVEYOR FOR VEHICLES WHILE TRAVERSING A VEHICLE WASHING SYSTEM

CROSS-REFERENCE TO RELATED APPLICATIONS

This is a non-provisional application of U.S. Provisional Application No. 63/306,568, filed on Feb. 4, 2022, the entirety of which is incorporated herein by reference.

BACKGROUND OF THE INVENTION

(1) Field of Invention

The present invention relates to conveyor systems and, more specifically, to a method and apparatus for linearly conveying wheeled vehicles through a vehicle washing system.

(2) Description of Related Art

Vehicle washing installations or systems have long been known in the art. Traditional vehicle washing systems include an elongated washing tunnel with a variety of washing tools that washing a vehicle passing through said tunnel. Notably, due to its automated nature, it is desirable to control the vehicle as it passing through the tunnel. In order to control the vehicle's motion through the washing tunnel, existing systems using a conveyor belt or chain with a roller that forces the tires forward through the tunnel. A problem with existing conveyor belts and chains is that they are costly and wear out quickly. An attempt to improve upon conveyor belts was employed by James Gray in U.S. Pat. No. 4,039,075 (the '075 Patent, which is incorporated by reference as though fully set forth herein). While somewhat operable, the device of the '075 Patent did not solve all the issues of the prior art.

Thus, a continuing need exists for an improved linear conveyor for moving vehicles through a vehicle washing system.

SUMMARY OF INVENTION

The present disclosure provides a linear conveyor for advancing vehicles through a vehicle washing system. The conveyor includes at least two reciprocating platforms, each platform having a plurality of counterweighted and pivotally connected pawls, whereby upon alternating motion of the reciprocating platforms causes a vehicle to move forward along the linear conveyor.

In another aspect, each reciprocating platform is formed of a frame member pivotally supporting the pawls, the pawls being biased such that they are angled upwards in a forward direction at rest.

In another aspect, the linear conveyor includes an alternating motion device operably connecting the reciprocating platforms with one another, such that forward motion of a first reciprocating platform causes a rearward motion of a second reciprocating platform.

In another aspect, a reciprocating drive system is connected with at least one of the reciprocating platforms to cause the at least one of the reciprocating platforms to reciprocate in alternating forward and rearward directions. The reciprocating drive system includes a motor connected with a crankshaft and rod, the crankshaft converting the rotational motion of the motor into reciprocating motion to cause the rod to move the at least one of the reciprocating platforms in alternating forward and rearward directions.

In yet another aspect, the pawls have apertures formed therethrough.

In another aspect, a loading mechanism is positioned adjacent to the at least two reciprocating platforms to selectively load a vehicle onto the at least two reciprocating platforms.

Further, the loading mechanism includes a sliding loading platform slideably positioned adjacent to each of the reciprocating platforms, wherein a connector selectively connects the sliding loading platform to the reciprocating platform so that the sliding loading platform and reciprocating platform move together in forward and rearward motions.

In another aspect, the loading mechanism includes a tipping load platform operable for tipping and causing a vehicle to roll downhill onto the at least two reciprocating platforms.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to conveyor systems and, more specifically, to a method and apparatus for linearly conveying wheeled vehicles. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction.

Instead, they are used to reflect relative locations and/or directions between various portions of an object.

(1) Description

Figure 1:
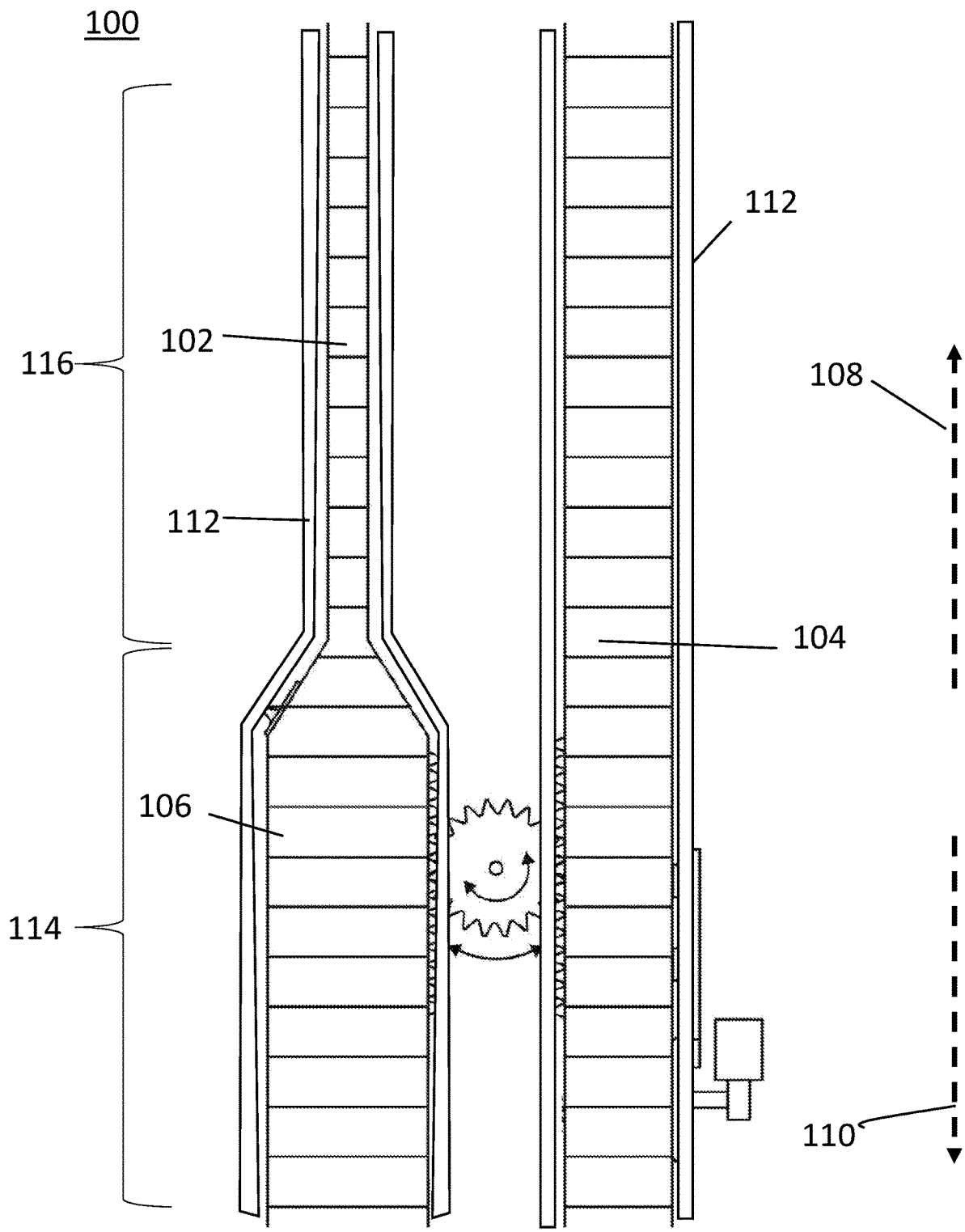
FIG. 1 is a top-view illustration of a linear conveyor according to various embodiments of the present invention, depicting a pair of reciprocating platforms.
Figure 5A:
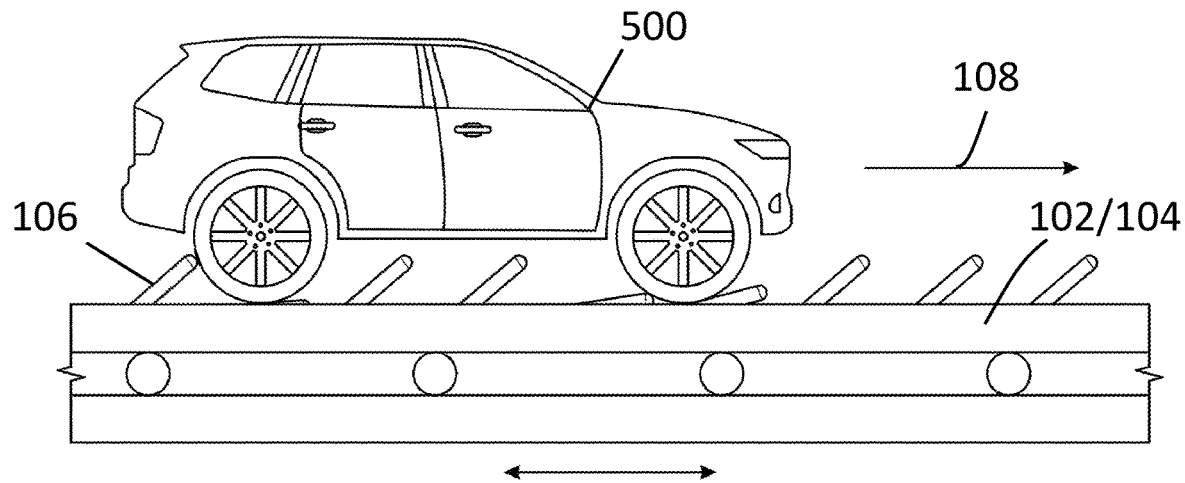
FIG. 5A is a side-view illustration depicting a vehicle being moved along the linear conveyor.
Figure 5B:
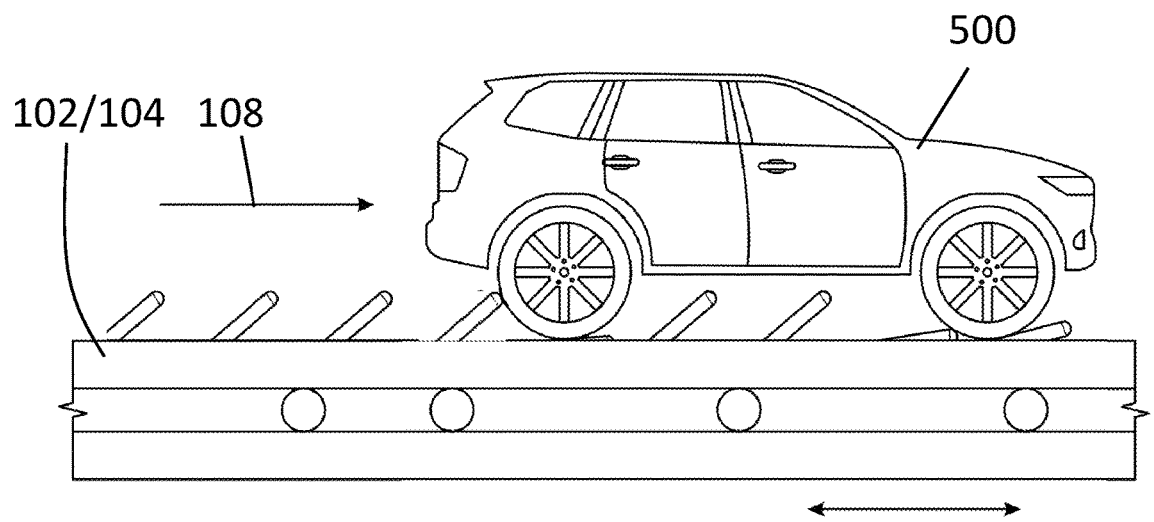
FIG. 5B is a side-view illustration depicting the vehicle being moved along the linear conveyor.

The present invention is directed to a method and apparatus for linearly conveying wheeled vehicles through a vehicle washing system. Specifically and as shown in FIG. 1, the present disclosure is directed to a linear conveyor system 100. The linear conveyor system 100 of the present disclosure provides an improvement over existing conveyor systems though two sections of alternatively reciprocating platforms 102 and 104, one section for the wheels on each side of the vehicle. Each reciprocating platform 102 and 104 has a series of pivotally connected and counter-weighted pawls 106. The pawls 106 are biased due to the counter-weight to be in an upward and forward facing 108 position (as shown in FIG. 5A). When moved the platform 102 or 104 is moved forward 108, the pawls 106 of the forward 108 moving platform 102 or 104 are forced or otherwise wedged against the rear side of the relevant tires to push the vehicle forward. Notably, each reciprocating platform 102 and 104 operates in an alternate direction to slowly move the vehicle forward along the platforms 102 and 104. In other words, as the pawls 106 are wedged against a vehicle's tires (due to the counterweight forcing the pawls up) and the selected reciprocating platform 102 or 104 moves in a forward 108 direction, the vehicle is forced forward while the other reciprocating platform 104 or 102 moves in a rearward 110 direction. Because the pawls 106 are pivotally connected and angled in a manner to be easily forced downward when the relevant reciprocating platform 102 or 104 is moved in the rearward 110 direction, the rearward moving platform 102 or 104 and pawls 106 are slid underneath the vehicles tires in the rearward 110 direction while the other platform 102 or 104 moves forward 108 to push the vehicle forward 108. When the motion of the platforms 102 or 104 is reversed, the previously rearward 110 moving platform 102 or 104 then moves forward 108 to continue pushing the vehicle in the forward 108 direction (while the previously forward 108 moving platform 102 or 104 moves rearward 110 to force down its pawls 106 and slide under the tires of the vehicle). As shown in FIGS. 5A and 5B, during each forward 108 stroke of the relevant platform 102 or 104, the wheel is engaged and blocked and the vehicle 500 is sequentially advanced the length of the forward 108 stroke during each forward reciprocation of the platform 102 or 104.

Figure 2:
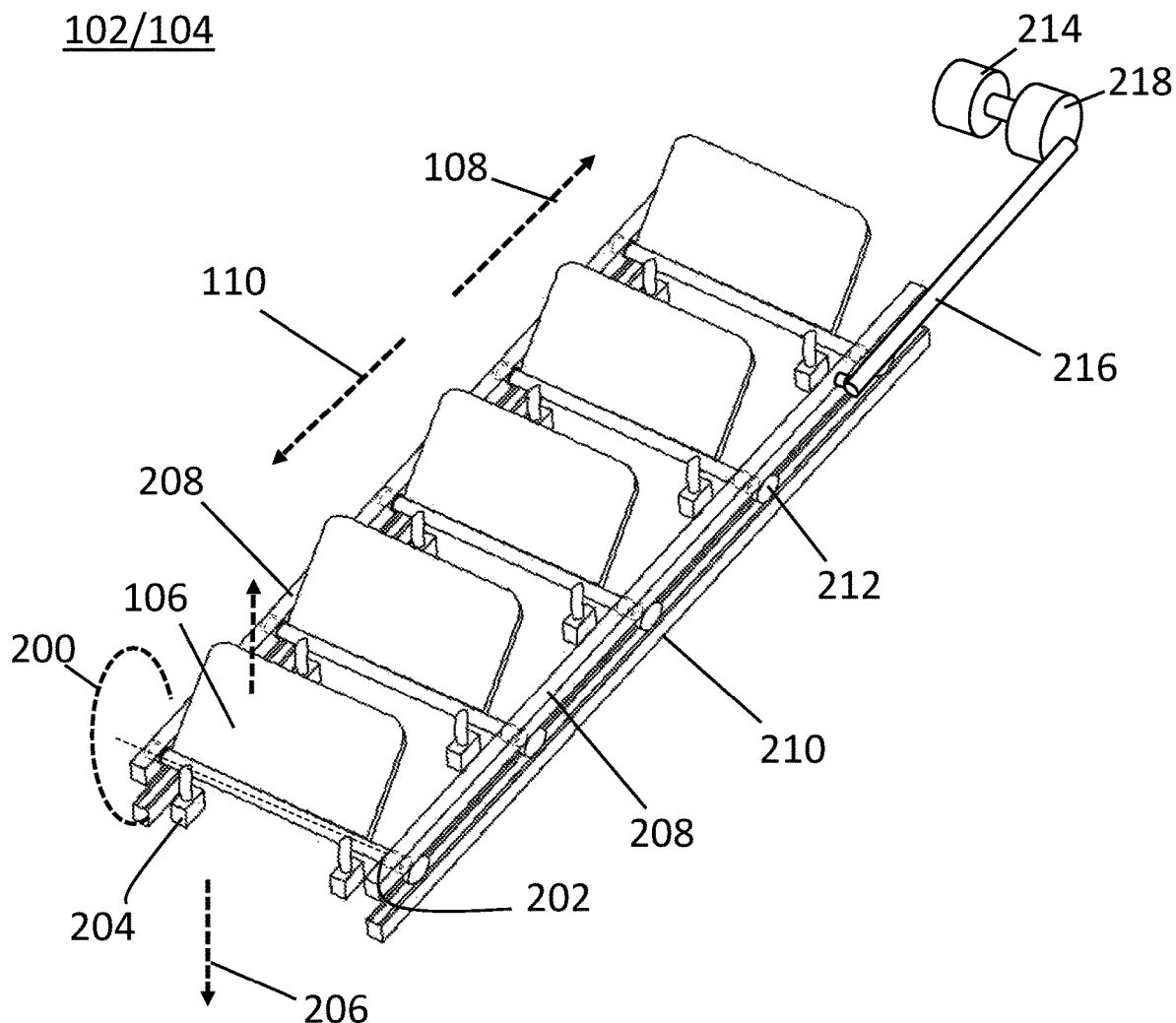
FIG. 2 is an illustration of the linear conveyor, depicting a single reciprocating platform.
Figure 3A:
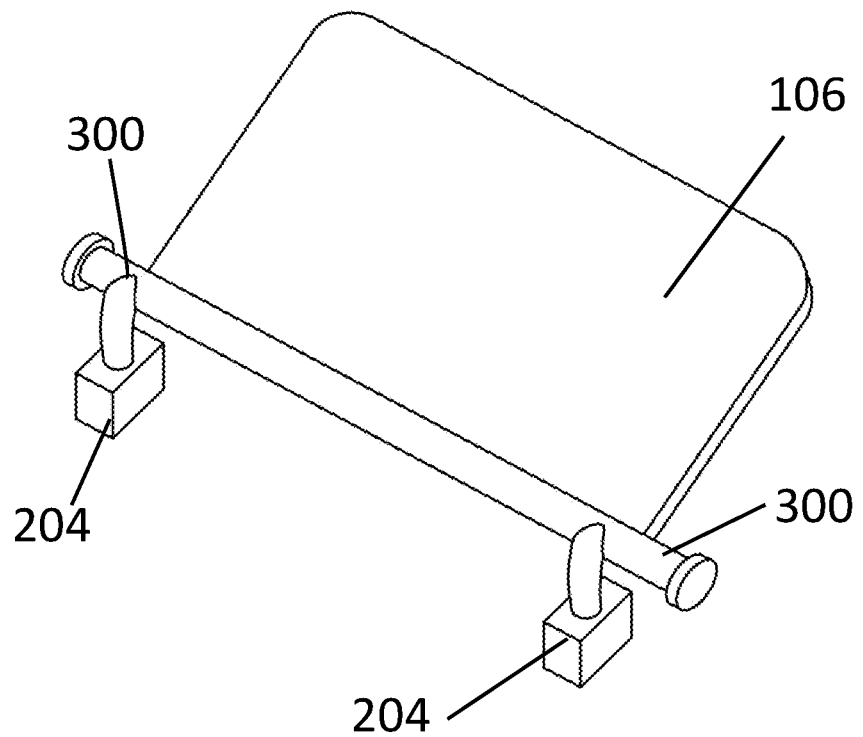
FIG. 3A is an illustration of a pawl as used in a reciprocating platform according to various embodiments of the present invention, depicting separate counterweights.
Figure 4:
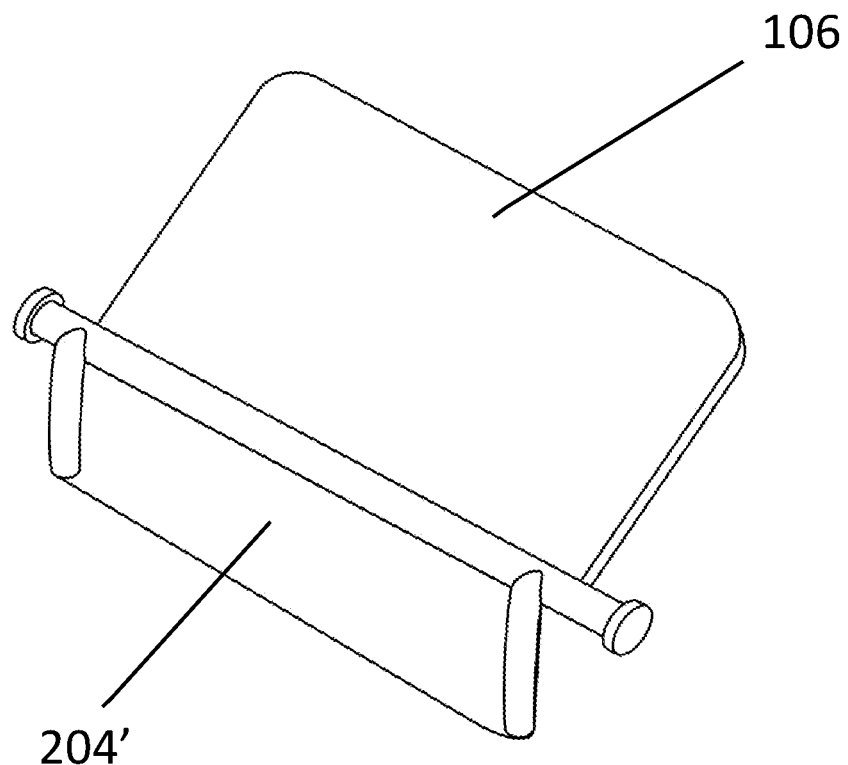
FIG. 4 is an illustration of a pawl as used in a reciprocating platform, depicting an embodiment with an elongated single counterweight.
Figure 7:
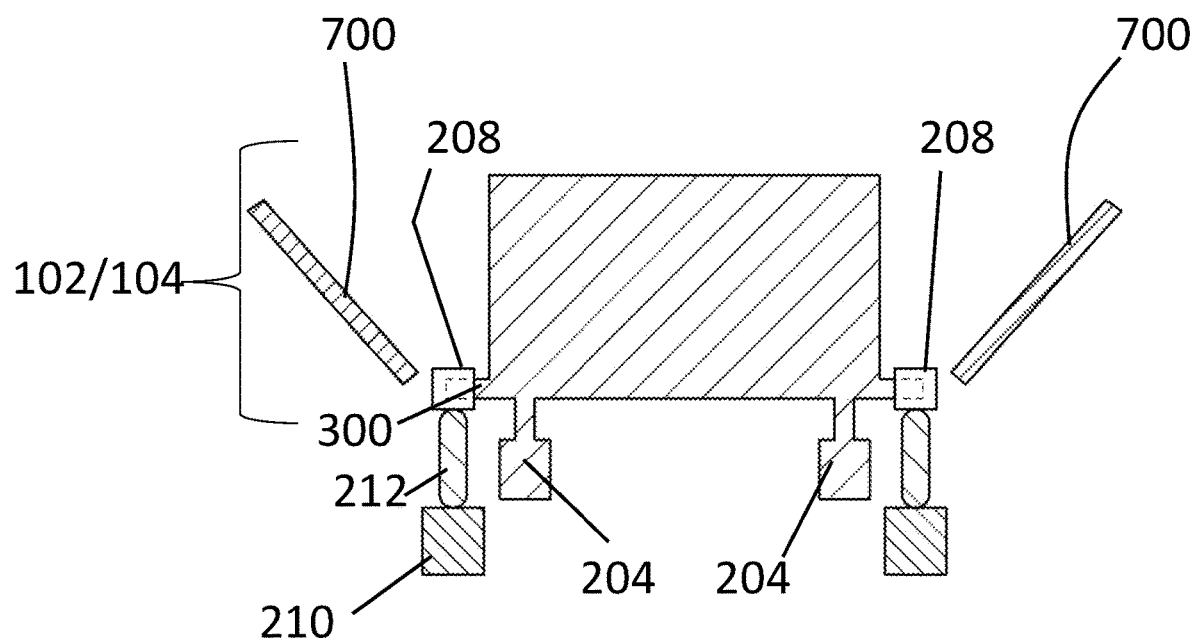
FIG. 7 is a cross-sectional view illustration of a pawl and reciprocating platform, depicting an aspect in which the counterweights are inside the platform frame members.
Figure 8:
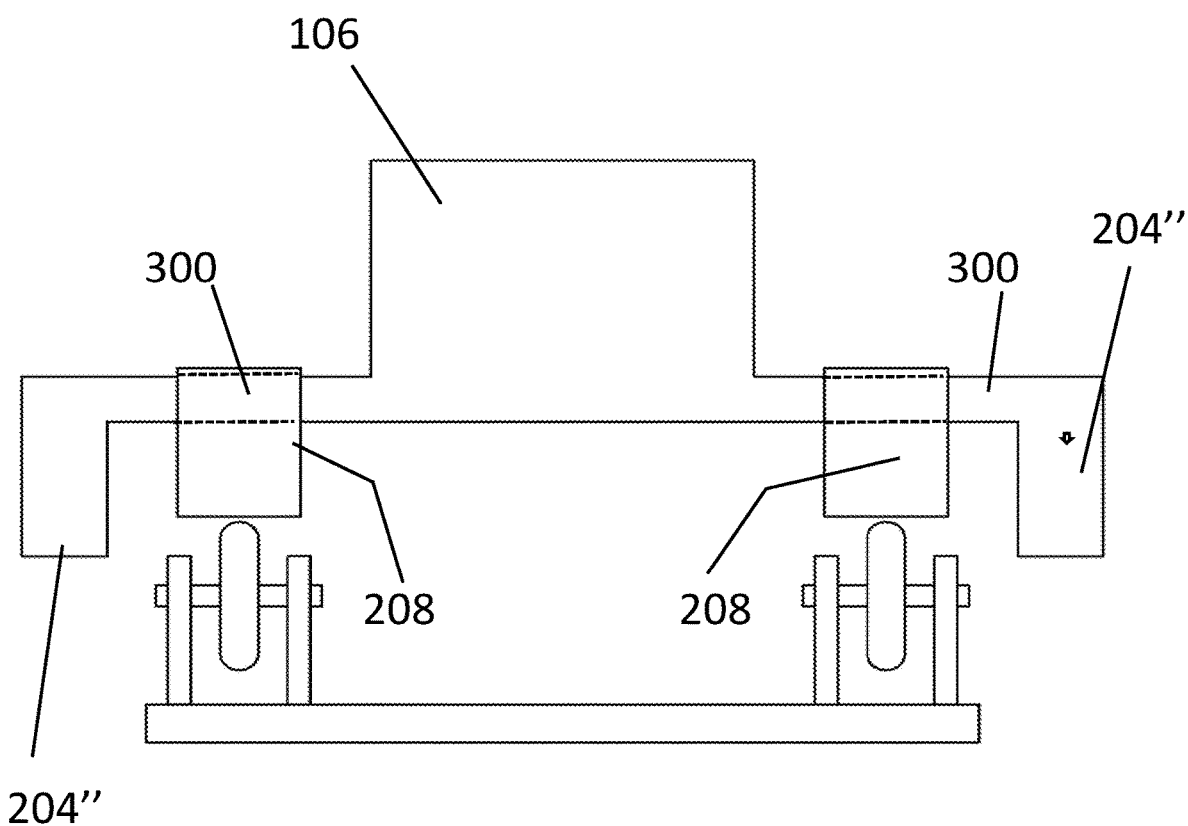
FIG. 8 is a cross-sectional view illustration of a pawl and reciprocating platform, depicting an aspect in which the counterweights are outside the platform frame members.

For further understanding, FIG. 2 depicts a reciprocating platform 102 or 104 with a series of pivotally connected pawls 106. As shown, each reciprocating platform 102 or 104 includes a platform frame member 208 with series of pivotally connected pawls 106. Each pawl 106 is pivotally connected with the platform frame member 208 such that the pawl 106 rotates 202 about an axis 204. Each pawl 106 can be affixed with the frame member 208 using any suitable mechanism, technique or device to allow for free pivotal rotation therebetween. As a non-limiting example, each pawl 106 can be formed to have an axle (depicted as element 300 in FIG. 3A) extending therefrom that rests with a slot, notch, or other aperture formed within the frame member 208. The counterweight 204 is affixed with a rearward portion of the pawl 106 to force (via gravity) the rearward portion downward 206, which forces the forward portion of the pawl 106 upwards. As shown in FIG. 3A, the counterweight can 204 can be one or more weighted portions that project downward from the pawl 106. In another aspect and as shown in FIG. 4, the counterweight 204' can span the length of the pawl 106, or otherwise be formed in any desired shape or location to bias the outer tip of the pawl 106 upward. In a desired aspect and as shown in the cross-sectional view of FIG. 7, the counterweights 204 are positioned within the platform such that they are between the frame members 208. Also shown are the rollers 212 that slideably support the platform frame members 208 above the bottom frame members 210. The aspect as shown in FIG. 7 is to be contrasted with that as depicted in FIG. 8. In another aspect and as shown in FIG. 8, the counterweights 204" can be positioned at the end of the axles 300 such that they reside outside of the platform frame members 208. Referring again to FIG. 2, regardless of the shape or positioning of the counterweights 204, they are affixed to the pawl 108 to force the tip of the pawl in an upward direction 204.

Referring again to the platforms 102 and 104, the pair reciprocating platforms 102 or 104 are alternatively slid forward 108 and rearward 110 in a reciprocating manner using any suitable mechanism or device. As a non-limiting example, the frame members 208 are on rollers 212 or bearings within a guide rail or other device to allow the sections to slide easily. For example, the frame members 208 are on rollers 212 that rest upon a ground surface or fixed bottom frame member 210. At least one of the reciprocating platforms 102 or 104 (e.g., left or right side) is driven by a reciprocating drive system, such as a motor or other device to cause the platform to reciprocate in alternating forward 108 and rearward 110 directions. As a non-limiting example, a motor 214 is connected with a crank shaft 218 and an offset driving or coupling rod 216 that is connected with one of the frame members 208 (on one of the platforms 102 or 104). As the motor 214 and/or crank shaft 218 rotates, it causes the offset rod 216 to move the platform 102 or 104 forward 108 and rearward 110 in a reciprocating manner.

Figure 10:
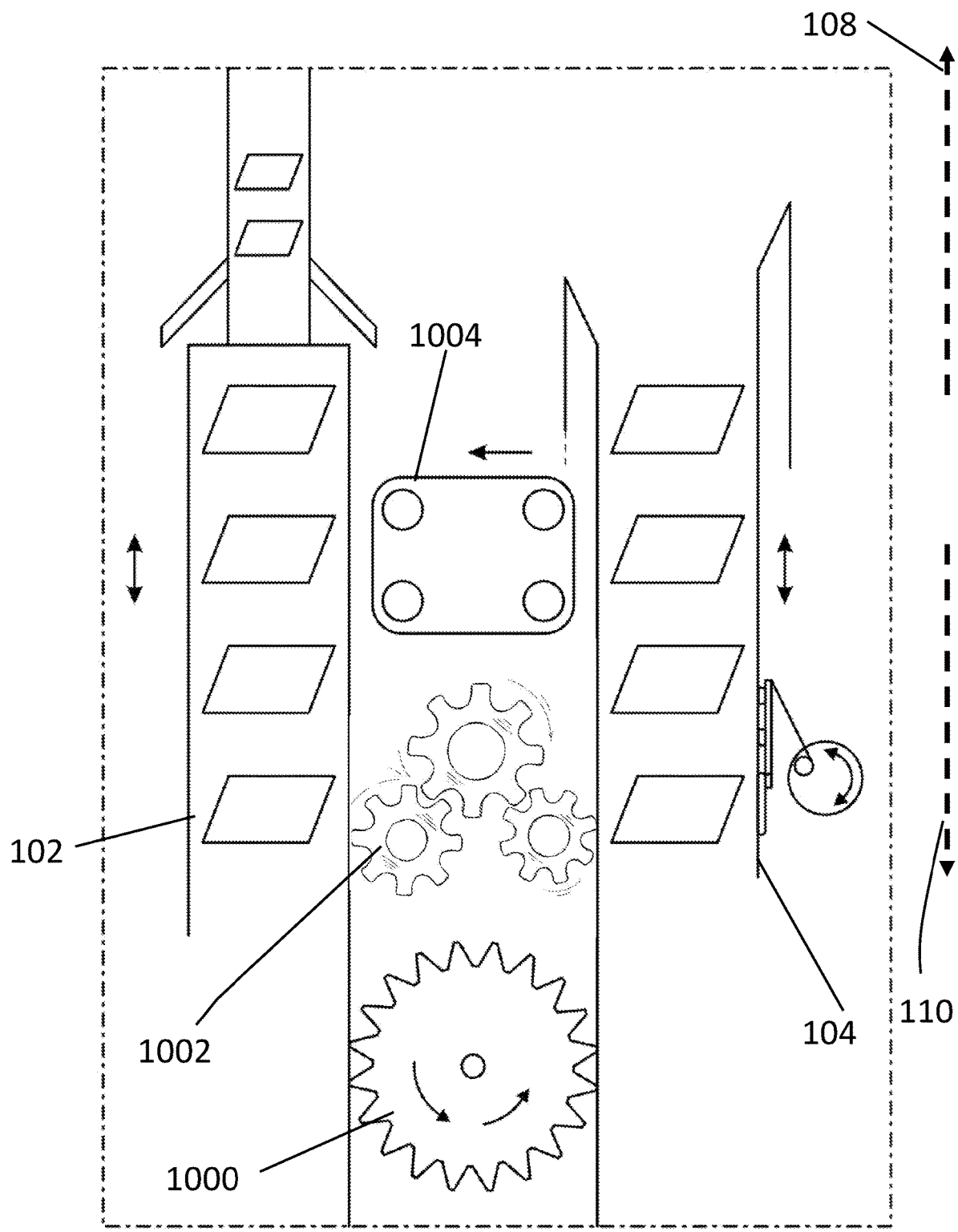
FIG. 10 is an illustration depicting example mechanisms for operation of the linear conveyor.

Further, each of the left and right platforms 102 and 104 move in an alternating manner (i.e., one moves forward 108 while the other simultaneously moves rearward 110) using any suitable mechanism or device. In one aspect, each platform 102 and 104 has its own drive motor that is coordinated to alternate the motion between the left and right platforms 102 and 104. However, desirably, an alternating motion device is connected between each platform 102 and 104. The alternating motion device is any mechanism or device that drives one platform 102 or 104 rearward 110 while the other platform 102 or 104 is driven forward 108. For further understanding, FIG. 10 illustrates several examples of alternating motion devices. It should be understood that although three examples are depicted, only one option need be implemented as the additional examples are provided for illustrative purposes only. In one example, a large gear 1000 with a sprocket is positioned between and operably engaged with the platforms 102 and 104, such that when one platform 102 moves forward 108, the gear 1000 is turned to drive the other platform 104 rearwards 110 (and vice versa). As yet another non-limiting example, a set of gears 1002 can be operably positioned between the two platforms 102 and 104. As another non-limiting example, a drive belt 1004, or any other mechanism or device can be operably connected between the two platforms 102 and 104 to cause the platforms 102 and 104 to effectively alternate between forward 108 and rearward 110 motions, thereby driving the vehicle forward upon the platforms 102 and 104.

Figure 6A:
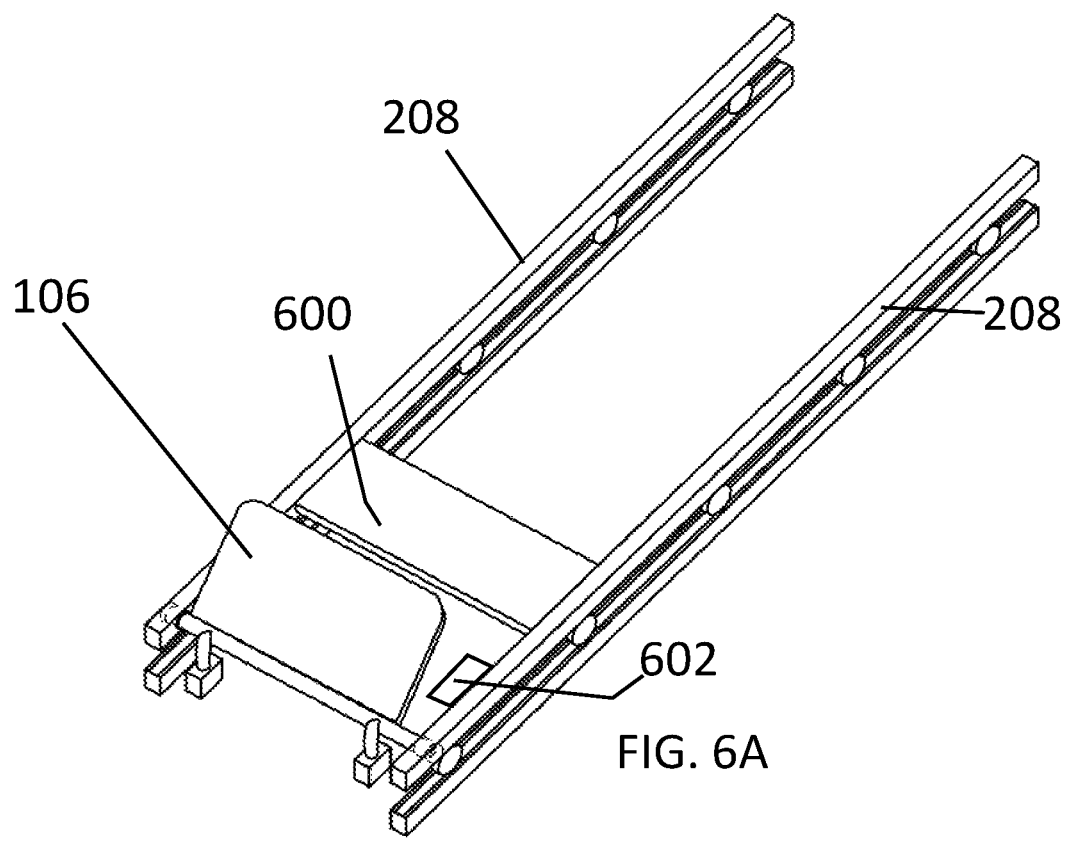
FIG. 6A is an illustration of a reciprocating platform, depicting an inter-pawl support.
Figure 6B:
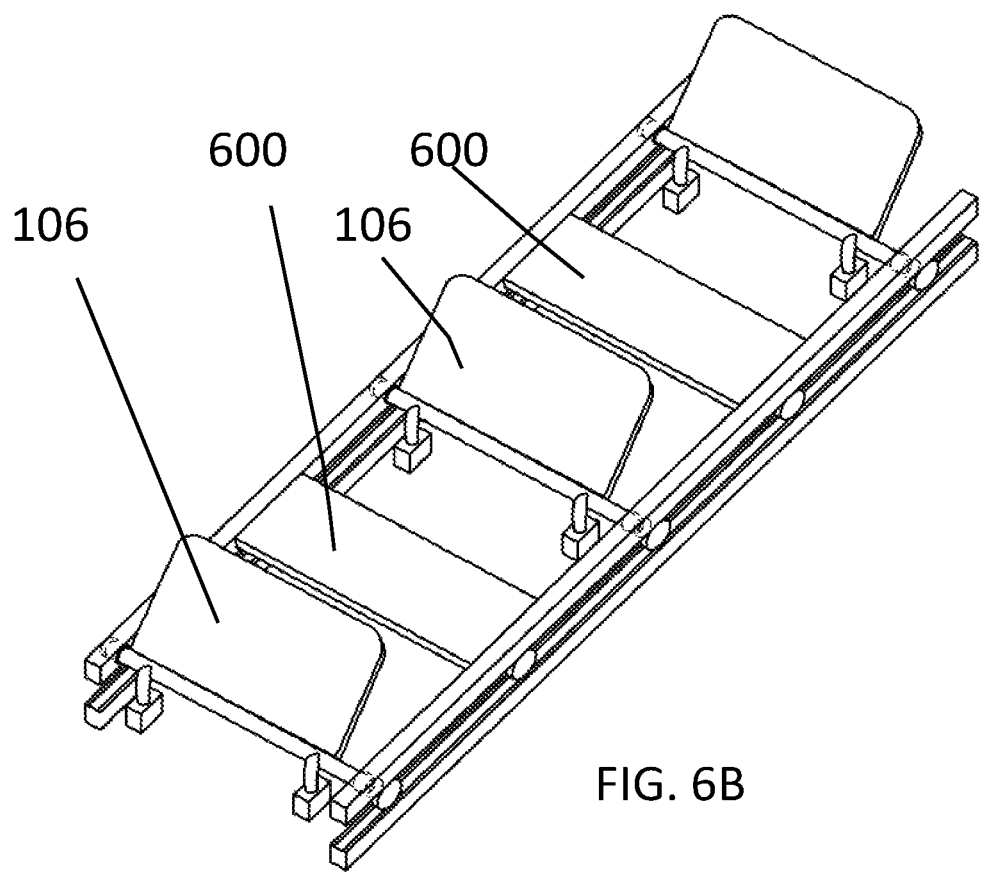
FIG. 6B is an illustration of a reciprocating platform, depicting a series of inter-pawl supports.

In some aspects, the pawls 106 nest or otherwise align with each other closely when placed flat and forced beneath the wheels of the vehicle. In other aspects, a small gap exists between the pawls 106. In this aspect and as shown in FIG. 6A, a support section 600 (i.e., inter-pawl support) can be affixed and positioned between the platform frame members 208 to support the vehicle. This aspect is further depicted in FIG. 6B, which shows a series of support sections 600 (inter-pawl supports) positioned between each set of pawls 106. The support sections 600 are any suitable mechanism or device operable for supporting the weight of a vehicle while maintaining the stability of the frame members 208. As a non-limiting example, the support sections 600 are metal plates that are wielded between the frame members 208. Thus, in one aspect, when the pawls 106 are pressed down (such as when moving rearward beneath a tire), the pawls 106 rest upon an adjacent support section 600 to support the pawl 106 and weight of the vehicle. In another aspect, a tab 602 or other locking shape can be used to support the pawls 106 when they are pressed down, with the support sections 600 being used to separately support the weight of the vehicle. Thus, in such an aspect, a series of tables 602 or shapes are formed in or otherwise attached to the frame members 208 to allow the pawls 106 to securely rest against the support members 208 when forced flat and underneath the tires of the vehicle.

Figure 3B:
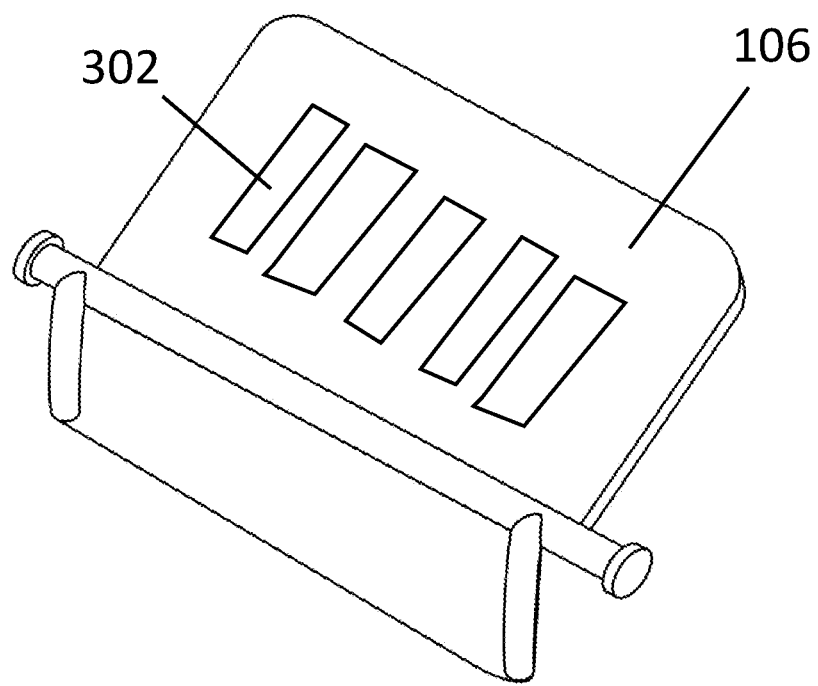
FIG. 3B is an illustration of a pawl as used in a reciprocating platform according to various embodiments of the present invention, depicting spaces formed through the pawl.
Figure 9:
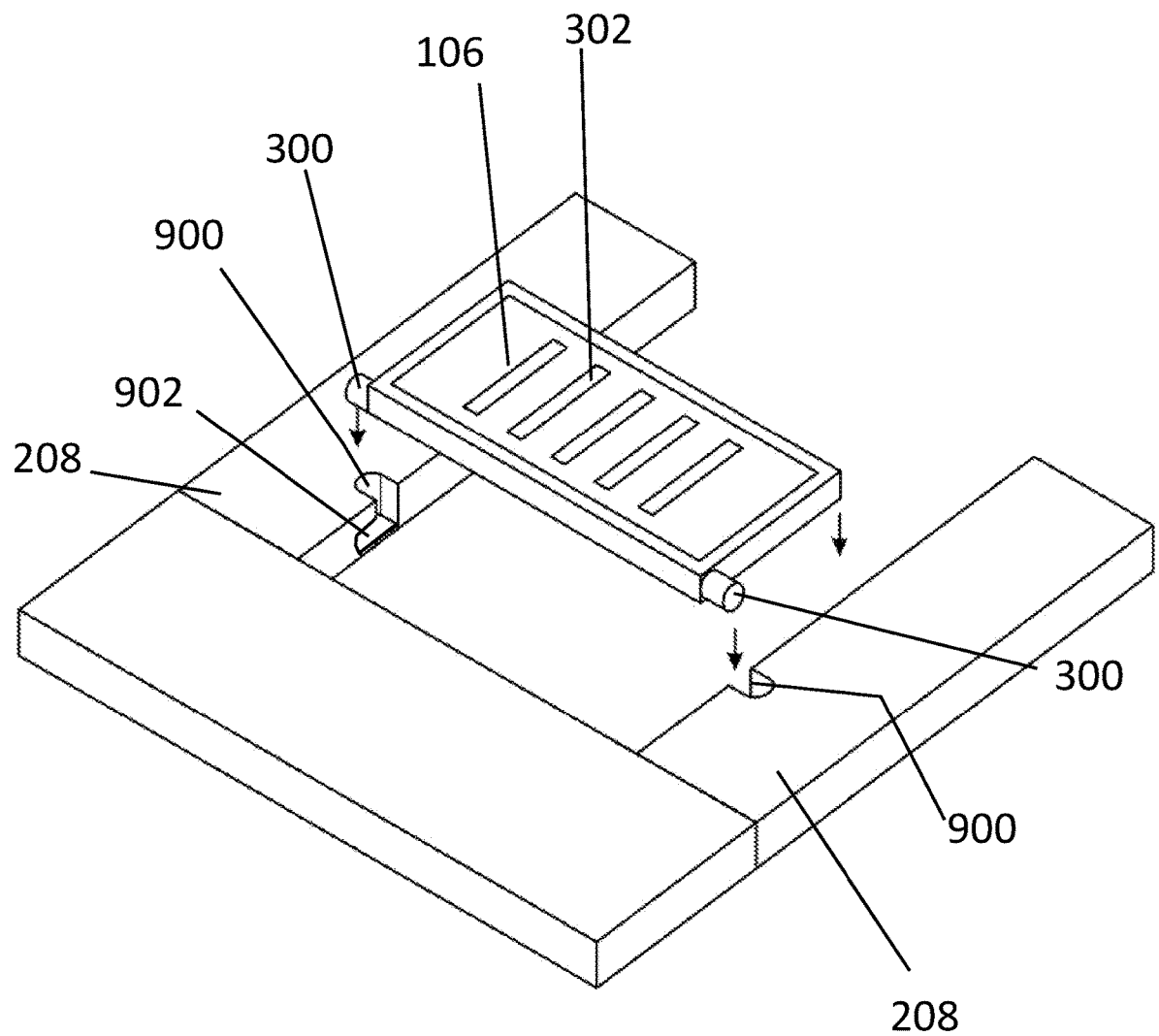
FIG. 9 is an illustration depicting a pawl as positioned into slots within the frame members of a reciprocating platform.

The pawls 106 are pivotally affixed with the platform frame members 208 using any suitable mechanism, technique, or device. In one aspect as shown in FIG. 7, the axles 300 of the pawls 106 can be slid within holes or apertures formed within the frame members 208. In another aspect and as shown in FIG. 9, the axles 300 can simply be set within slots 900 formed on the top surface of the platform frame members 208. The slot 900 can also be formed with an offset 302 to allow for securing the axle 300 against the frame members 208. Notably, the offset 902 is in a rearward portion of the slot 900 such that the axle 300 forcibly secured within the offset 902 during forward motion of the platforms. In either event, the pawls 106 are affixed with the frame members 208 to allow for rotational motion of the pawls 106. Regarding the pawls 106, in some aspects, the pawls 106 are formed as solid plates (as shown in FIG. 3A). In another aspect and as shown in FIGS. 3B and 9, the weight of the pawls 106 can be reduced by forming one or more apertures 302 formed through the pawl 106. Reducing the weight allows the pawl 106 to return more easily to an upright location after being passing under a vehicle's tires. Further, in another aspect, a soap spray or other solution can be sprayed onto the platforms 102 and 104 or pawls 106 to assist the pawls 106 in sliding underneath a vehicle's tires when the relevant platform 102 or 104 is moving rearward.

Figure 11:
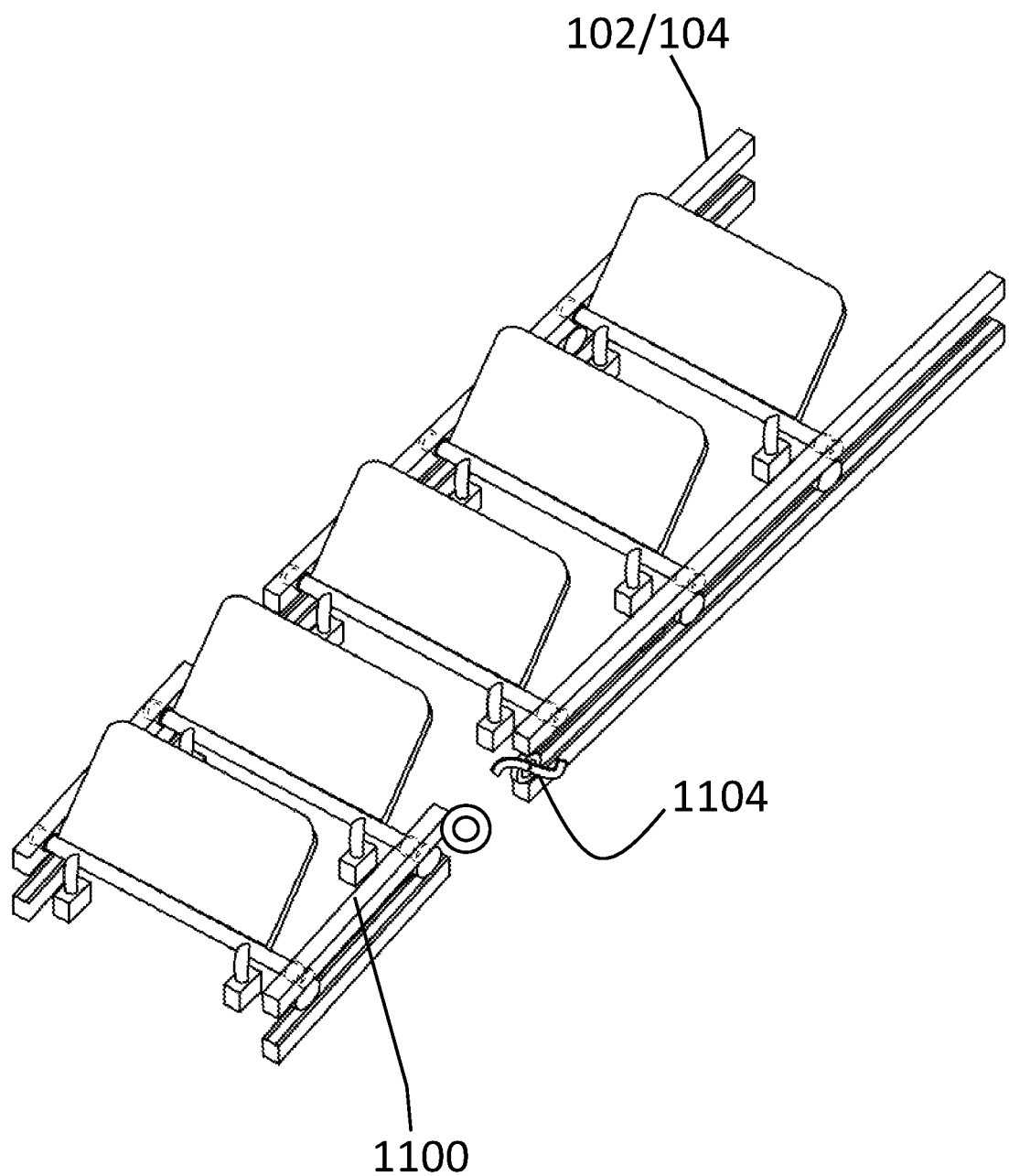
FIG. 11 is an illustration depicting a reciprocating platform with a loading section and a main section according to various embodiments.

As evident above, the linear conveyor is operable for moving a vehicle forward through reciprocating motion of the platforms 102 and 104. While a vehicle can be driven upon the platforms 102 and 104 and then placed in neutral, it is also desirable to include a mechanism to load the vehicle onto the platforms 102 and 104. In other words, when a vehicle is loading onto the conveyor, the vehicle may not yet be in neutral so it is desirable to avoid prematurely driving the vehicle through the linear conveyor. Thus, in another aspect, the linear conveyor also includes any mechanism or device operable for loading the vehicle onto the platforms 102 and 104. For example, in one aspect and as shown in FIG. 11, each platform 102 and 104 has a sliding loading platform 1100 positioned adjacent to the platforms 102 and 104. In this aspect, the sliding loading platform 1100 can be selectively connected to or detached from the platforms 102 and 104. As noted above, the platforms 102 and 104 are operably connected to the driving motor or other mechanism that provides the forward and lateral motion of the platforms 102 or 104. However, the sliding loading platform 1100 is free of lateral motion until connected with the reciprocating platforms 102 and 104. In this aspect, a connector 1104 (e.g., mechanically actuated device) can be used to selectively hook or otherwise connect the sliding loading platform 1100 to the reciprocating platforms 102 and 104 so that they work together when desired (i.e., reciprocatively move between forward and rearward motions).

Figure 12A:
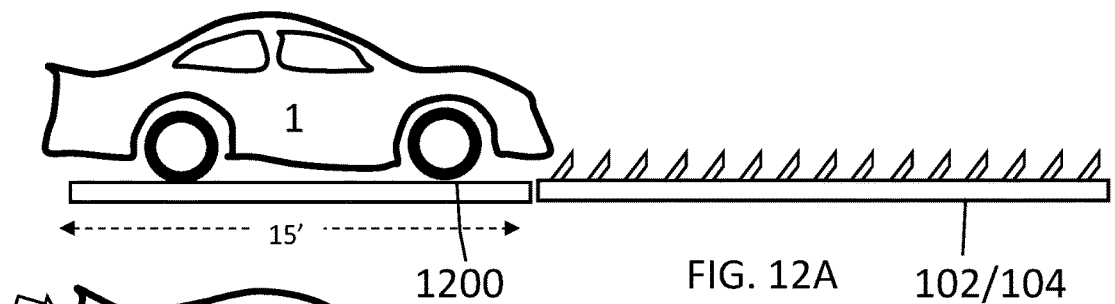
FIG. 12A is an illustration depicting a tipping load platform for loading the vehicle onto the reciprocating platforms.
Figure 12B:
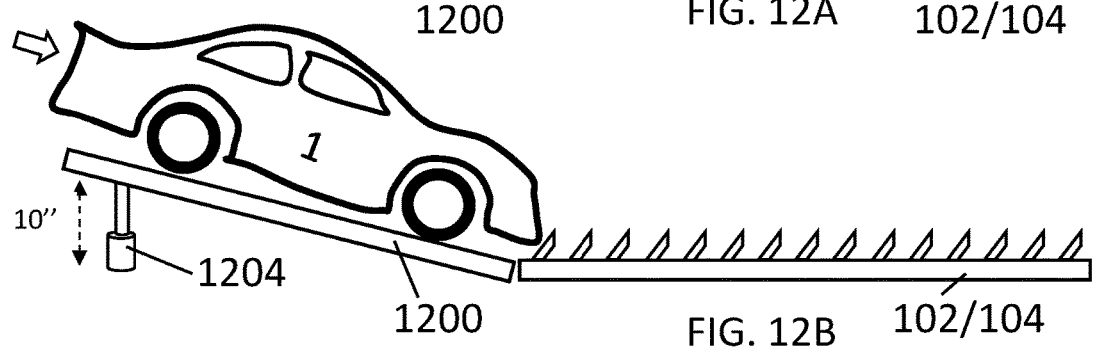
FIG. 12B is an illustration depicting the tipping load platform as being lifted to cause the vehicle to roll toward the reciprocating platforms.
Figure 12C:
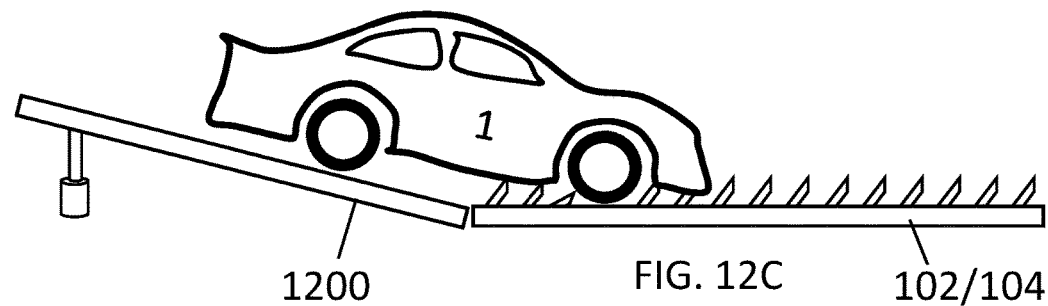
FIG. 12C is an illustration depicting the vehicle as rolling onto the reciprocating platforms.
Figure 12D:
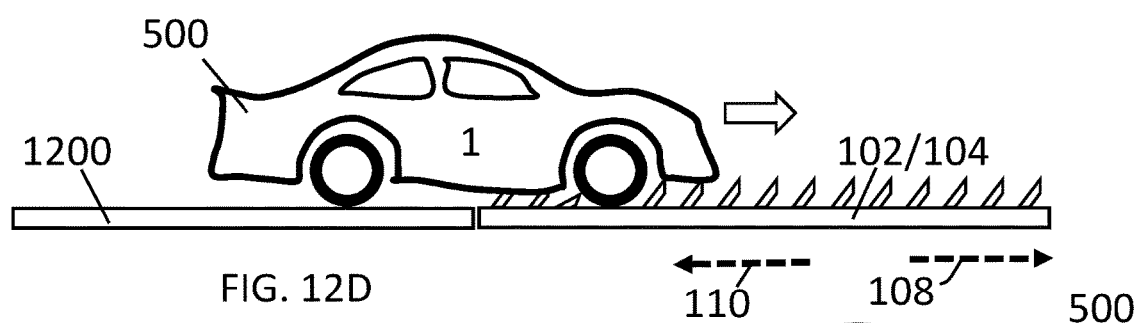
FIG. 12D is an illustration depicting the vehicle as loaded onto the reciprocating platforms.
Figure 12E:
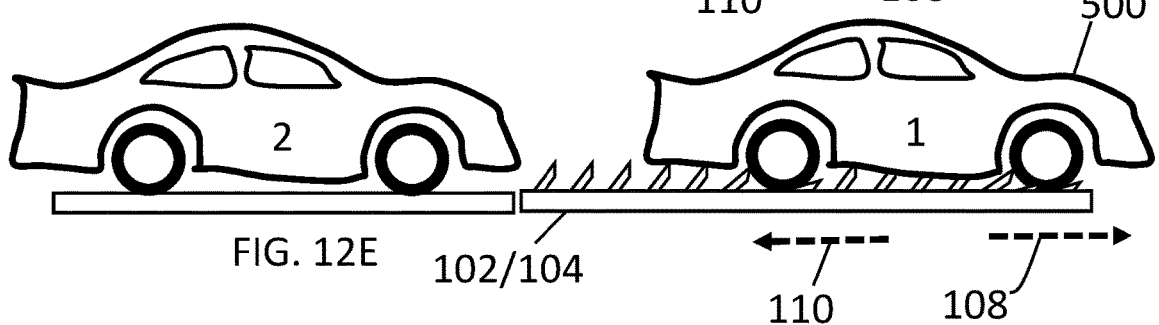
FIG. 12E is an illustration depicting the vehicle as being forced forward through the linear conveyor by the alternating motion of the reciprocating platforms and series of pawls.

Another non-limiting example of a loading mechanism can be seen in FIGS. 12A through 12E. In this aspect, the linear conveyor includes a tipping load platform 1200 adjacent to the reciprocating platforms 102 and 104. As shown in the figures, the tipping load platform 1200 is pivotally anchored at a front end, while being liftable at a rear end using any lifting mechanism 1204 (e.g., a pneumatic lift, etc.). Thus, in use, a user would drive their vehicle upon the tipping load platform 1200 and then place the car in neutral. Thereafter, the lifting mechanism 1204 lifts the rear end of the tipping load platform 1200 to cause the vehicle to freely roll upon the reciprocating platforms 102 and 104. Once loaded onto the reciprocating platforms 102 and 104 (as shown in FIGS. 12D and 12E), the platforms 102 and 104 can be caused to alternatively move forward 108 and rearward 110 to advance the vehicle across the linear conveyor. In some aspects and as shown in FIG. 12D, once a portion of the vehicle 500 is loaded onto the reciprocating platforms 102 and 104, the tipping load platform 1200 is lowered to allow a second vehicle to enter the linear conveyor by driving upon the tipping load platform 1200 (as shown in FIG. 12E). A sensor, switch or other mechanism or device can be used to notify the system that the vehicle 500 has been loaded (partially or fully, as desired or otherwise designed) onto the reciprocating platforms 102 and 104 to begin cause the system to initiate the alternatively reciprocating motions of the reciprocating platforms 102 and 104 and lower the tipping load platform 1200 to allow for the second vehicle.

As the vehicle advances, in some instances, the vehicle may tend to drift to the left or right. To prevent the vehicle from drifting laterally, guard rails or angled plates can be added to maintain the vehicle upon the reciprocating platforms 102 and 104. For example and as shown in FIG. 7, angled plates 700 or rails can be added to each side of one or both reciprocating platforms 102 and 104 to run the length of the relevant reciprocating platform 102 and 104. Thus, should the vehicle drift laterally, the angled plates 700 or guard rails maintain the vehicle's wheels upon the platforms 102 and 104. For further understanding, FIG. 1 also depicts sets of guard rails 112 positioned on each side of the platforms 102 and 104 to direct drifting tires back onto the platforms 102 and 104. In another aspect (although not required), one or more of the platforms 102 and 104 can be desirably formed to have at least a first section 114 and a second section 116, where the first section 114 is wider than the second section 116. In other words, as the vehicle is pushed through the linear conveyor, the tires of the vehicle are forced (via the guard rails 112 or angled plates, etc.) into increasingly narrow sections of platform 102 and 104. By decreasing the width of the platform 102 or 104 as the vehicle traverses the linear conveyor, the tire is prevented from drifting to maintain the vehicle in a steady lateral position while moving forward 108 along the linear conveyor.

The drawings submitted herewith illustrate several example aspects of the linear conveyor that can be used according to the principles of the present invention. It should also be understood that the conveyor includes any extra parts or components as may be necessary as understood by those skilled in the art when implementing the concept as described and illustrated.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A linear conveyor for advancing vehicles through a vehicle washing system, comprising:
    at least two reciprocating platforms, each platform having a plurality of counterweighted and pivotally connected pawls, whereby alternating motion of the reciprocating platforms is delivered from a first platform of the at least two platforms to a second platform that causes a vehicle to move forward along the linear conveyor.

2. The linear conveyor as set forth in claim 1, wherein each reciprocating platform is formed of a frame member pivotally supporting the pawls, the pawls being biased such that they are angled upwards in a forward direction at rest.

3. The linear conveyor as set forth in claim 2, further comprising an alternating motion device operably connecting the reciprocating platforms with one another, such that forward motion of a first reciprocating platform causes a rearward motion of a second reciprocating platform.

4. The linear conveyor as set forth in claim 3, further comprising a reciprocating drive system connected with at least one of the reciprocating platforms to cause the at least one of the reciprocating platforms to reciprocate in alternating forward and rearward directions.

5. The linear conveyor as set forth in claim 4, wherein the reciprocating drive system includes a motor connected with a crankshaft and rod, the crankshaft converting the rotational motion of the motor into reciprocating motion to cause the rod to move the at least one of the reciprocating platforms in alternating forward and rearward directions.

6. The linear conveyor as set forth in claim 5, where the pawls have apertures formed therethrough.

7. The linear conveyor as set forth in claim 6, further comprising a loading mechanism positioned adjacent to the at least two reciprocating platforms to selectively load a vehicle onto the at least two reciprocating platforms.

8. The linear conveyor as set forth in claim 7, wherein the loading mechanism includes a sliding loading platform slideably positioned adjacent to each of the reciprocating platforms, wherein a connector selectively connects the sliding loading platform to the reciprocating platform so that the sliding loading platform and reciprocating platform move together in forward and rearward motions.

9. The linear conveyor as set forth in claim 7, wherein the loading mechanism includes a tipping load platform operable for tipping and causing a vehicle to roll downhill onto the at least two reciprocating platforms.

10. The linear conveyor as set forth in claim 1, further comprising a reciprocating drive system connected with at least one of the reciprocating platforms to cause the at least one of the reciprocating platforms to reciprocate in alternating forward and rearward directions.

11. The linear conveyor as set forth in claim 10, wherein the reciprocating drive system includes a motor connected with a crankshaft and rod, the crankshaft converting the rotational motion of the motor into reciprocating motion to cause the rod to move the at least one of the reciprocating platforms in alternating forward and rearward directions.

12. The linear conveyor as set forth in claim 1, further comprising a loading mechanism positioned adjacent to the at least two reciprocating platforms to selectively load a vehicle onto the at least two reciprocating platforms.

13. The linear conveyor as set forth in claim 12, wherein the loading mechanism includes a sliding loading platform slideably positioned adjacent to each of the reciprocating platforms, wherein a connector selectively connects the sliding loading platform to the reciprocating platform so that the sliding loading platform and reciprocating platform move together in forward and rearward motions.

14. The linear conveyor as set forth in claim 12, wherein the loading mechanism includes a tipping load platform operable for tipping and causing a vehicle to roll downhill onto the at least two reciprocating platforms.

15. The linear conveyor as set forth in claim 1, further comprising an alternating motion device operably connecting the reciprocating platforms with one another, such that forward motion of a first reciprocating platform causes a rearward motion of a second reciprocating platform.

16. The linear conveyor as set forth in claim 1, where the pawls have apertures formed therethrough.

\* \* \* \* \*